United States Patent
Reid et al.

(10) Patent No.: US 7,077,531 B2
(45) Date of Patent: Jul. 18, 2006

(54) REFLECTOR APPARATUS AND METHOD FOR REFLECTING LIGHT UPON A FILM SET USING THE REFLECTOR APPARATUS

(76) Inventors: Chris Reid, 11419 Aqueduct Ave., Granada Hills, CA (US) 91344; Calese Russell, 5333 Balboa, Apt. #269, Encino, CA (US) 91316; Wendell Harris, 364 E. Mendocino, Altadena, CA (US) 91001; Earl Harris, 1430 N. Wesley Ave., Pasadena, CA (US) 91105; Charles Sorenson, 1434½ N. Los Robles Ave., Pasadena, CA (US) 91104

( * ) Notice: Subject to any disclaimer, the term of this patent is extended or adjusted under 35 U.S.C. 154(b) by 0 days.

(21) Appl. No.: 10/893,463

(22) Filed: Jul. 16, 2004

(65) Prior Publication Data

US 2006/0012897 A1 Jan. 19, 2006

(51) Int. Cl.
*G02B 5/08* (2006.01)
(52) U.S. Cl. ........................ 359/850; 359/599; 362/283; D16/241
(58) Field of Classification Search ................ 359/870, 359/882, 599; 396/200; 362/16, 341, 351
See application file for complete search history.

(56) References Cited

U.S. PATENT DOCUMENTS

| | | | | |
|---|---|---|---|---|
| 3,378,678 A | * | 4/1968 | De Groff | 362/5 |
| 3,821,760 A | * | 6/1974 | Kennedy | 396/2 |
| 3,970,835 A | * | 7/1976 | Crete | 362/11 |
| 4,314,280 A | * | 2/1982 | Rose | 348/842 |
| 4,524,405 A | * | 6/1985 | Heard | 362/18 |
| 4,998,189 A | * | 3/1991 | Guggemos | 362/278 |
| D357,492 S | * | 4/1995 | Henry | D16/241 |
| 5,456,515 A | * | 10/1995 | Dang | 296/95.1 |
| 6,497,946 B1 | * | 12/2002 | Kretman et al. | 428/317.9 |
| 2002/0054432 A1 | * | 5/2002 | Graham | 359/599 |

OTHER PUBLICATIONS

Coroplast Firewall FRB, 2003, http://www.coroplast.com/firewall.htm.*

* cited by examiner

*Primary Examiner*—Drew A. Dunn
*Assistant Examiner*—Scott H. Stephens
(74) *Attorney, Agent, or Firm*—Tope-McKay & Assoc.

(57) ABSTRACT

The present invention relates to a reflector apparatus for reflecting light upon a film set. The reflector apparatus comprises a fire retardant frame formed of a twin wall board made with a block-copolymer polypropylene resin with flame inhibiting properties. A flexible fire retardant sheet is detachably attached with the frame. The fire retardant sheet is constructed of a fire retardant material such as ripstop, ultra bounce, and nugget cloth. Through use of the reflector apparatus, a user can direct the light from a lamp onto the frame and/or flexible fire retardant sheet to be reflected onto the film set, allowing the user to control lighting conditions of the film set. The present invention also relates to a method for reflecting light upon a set using the reflector apparatus described herein.

6 Claims, 8 Drawing Sheets

REFLECTOR APPARATUS AND METHOD FOR REFLECTING LIGHT UPON A FILM SET USING THE REFLECTOR APPARATUS

FIELD OF INVENTION

The present invention relates to a reflector apparatus and method for reflecting light using the reflector apparatus, and more particularly, to a fire retardant reflector apparatus for reflecting light from a lamp upon a film set, allowing a user to control lighting conditions of the film set.

BACKGROUND OF INVENTION

When filming on a film set, lighting equipment is often used to illuminate the film set and control the lighting conditions. Light provided by the lighting equipment can either be directly shone onto the film set, or shone upon a reflecting surface and thereafter reflected upon the film set. When directly shone onto the film set, the light is often too focused and harsh, resulting in undesirable filming conditions. This is to be contrasted with reflected light, where the light reflected onto the film set is generally more uniformly spread and less harsh than direct light.

In order to reflect the light, reflector devices have long been used. While functional for reflecting the light, the devices currently available suffer from inherent problems. The reflector devices currently available are typically constructed of wood and/or cardboard. The wood and/or cardboard provides a sufficiently reflective surface. However, they are also combustible materials. The lighting equipment generates heat, and when the light is directed upon the wood and/or cardboard surface, that heat is focused upon the surface of the reflector device. Due to the amount of heat present, and due to the combustible nature of wood and/or cardboard, it is possible that the reflector device could catch fire and create a potentially dangerous situation. Thus, a continuing need exists for a reflector device that sufficiently reflects light, yet includes fire retardant properties.

SUMMARY OF INVENTION

The present invention relates to a reflector apparatus and method for reflecting light using the reflector apparatus. The reflector apparatus comprises fire retardant frame. Through use of the reflector apparatus, a user can direct the light from a lamp onto the frame to be reflected onto the film set, allowing the user to control lighting conditions of the film set. The fire retardant frame is formed of a twin wall board made with a block-copolymer polypropylene resin with flame inhibiting additives, such as Coroplast.

In another aspect, an attachment apparatus connected with the frame. The attachment apparatus is selected from a group consisting of Velcro, snaps, and tape. The frame further includes a perimeter portion and the attachment apparatus is connected with the frame at the perimeter portion. A flexible fire retardant sheet is detachably attached with the attachment apparatus and is constructed of a material selected from a group consisting of ripstop, ultra bounce, and nugget cloth.

In another aspect, the frame includes a first part and a second part with a hinge connecting the first part with the second part such that an angle between the first part and the second part can be changed by pivoting the first and second parts about the hinge, thereby allowing a user to change and control lighting conditions.

In yet another aspect, an adjuster is connected with both the first part and the second part. The adjuster allows the angle between the first part and the second part to be fixedly adjusted to allow a user to fixedly adjust lighting conditions. The adjuster is connected with the perimeter portions of the first and second parts and is selected from a group consisting of a wire, rope, a flex arm, and a nylon strap with a buckle. The flex arm is a rigid arm that can be forcibly bent into a particular shape. When bent into the particular shape, the flex arm maintains its shape until forcibly bent into another shape.

In another aspect, at least one hanging hook is attached with the perimeter portion of the frame, thereby allowing user to hang the reflector apparatus with the at least one hanging hook.

Additionally, the frame has a front side and a back side, with a hanging adjuster connected with the back side, thereby allowing a user to adjust an angle of the frame in relation to the lamp by selectively attaching hanging objects with the hanging adjuster. The hanging adjuster is a spring loaded ring.

In yet another aspect, at least one additional frame is connected with the perimeter portion of another frame through a mechanism selected from a group consisting of Velcro, a buckle, and a hook and latch.

Furthermore, a plate with a ball joint and adjustable rod is connected with the back side of the frame, thereby allowing an angle of the frame to be adjusted in relation to light from the lamp.

In another aspect, the frame is formed in a shape to slide over a light emitting end of a lamp.

Finally, as can be appreciated by one in the art, the present invention also comprises a method for reflecting light upon a film set using the reflector apparatus according to the present invention.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a reflector apparatus and method for reflecting light using the reflector apparatus, and more particularly, to a fire retardant reflector apparatus for reflecting light from a lamp upon a film set, allowing a user to control lighting conditions of the film set.

The following description, taken in conjunction with the referenced drawings and/or tables, is presented to enable one of ordinary skill in the art to make and use the invention. Various modifications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein. Furthermore, it should be noted that unless explicitly stated otherwise, the figures included herein are illustrated qualitatively and without any specific scale, and are intended to generally present the concept of the present invention.

In order to provide a working frame of reference, first an introduction is provided. Next, a discussion of various aspects of the present invention is provided to give an understanding of the specific details.

(1) Introduction

In order to control lighting situations on a film set, a reflector apparatus is often used, allowing a user to reflect light off of the reflector apparatus and onto the film set. Reflector apparatus currently used are constructed of wood and/or paperboard. However, heat generated by the light can create a dangerous situation where the reflector apparatus could catch fire. The present invention reduces this risk by being constructed out of a fire retardant material, allowing a user to confidently direct the light from a lamp onto the reflector apparatus without fear of starting a fire.

(2) Detailed Discussion

Figure 1:
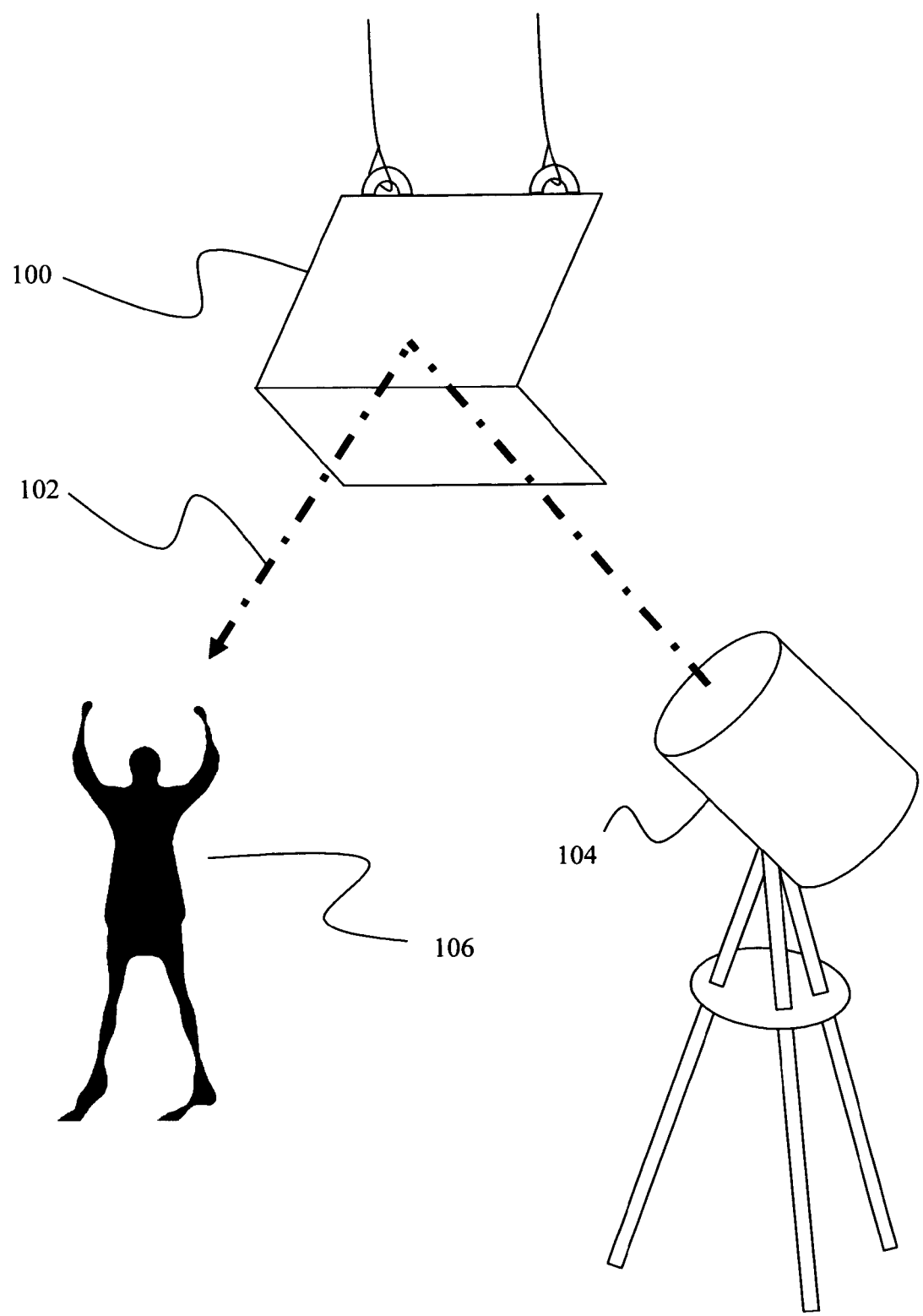
FIG. 1 is an illustration of a reflector apparatus according to the present invention, shown in operation.
Figure 2:
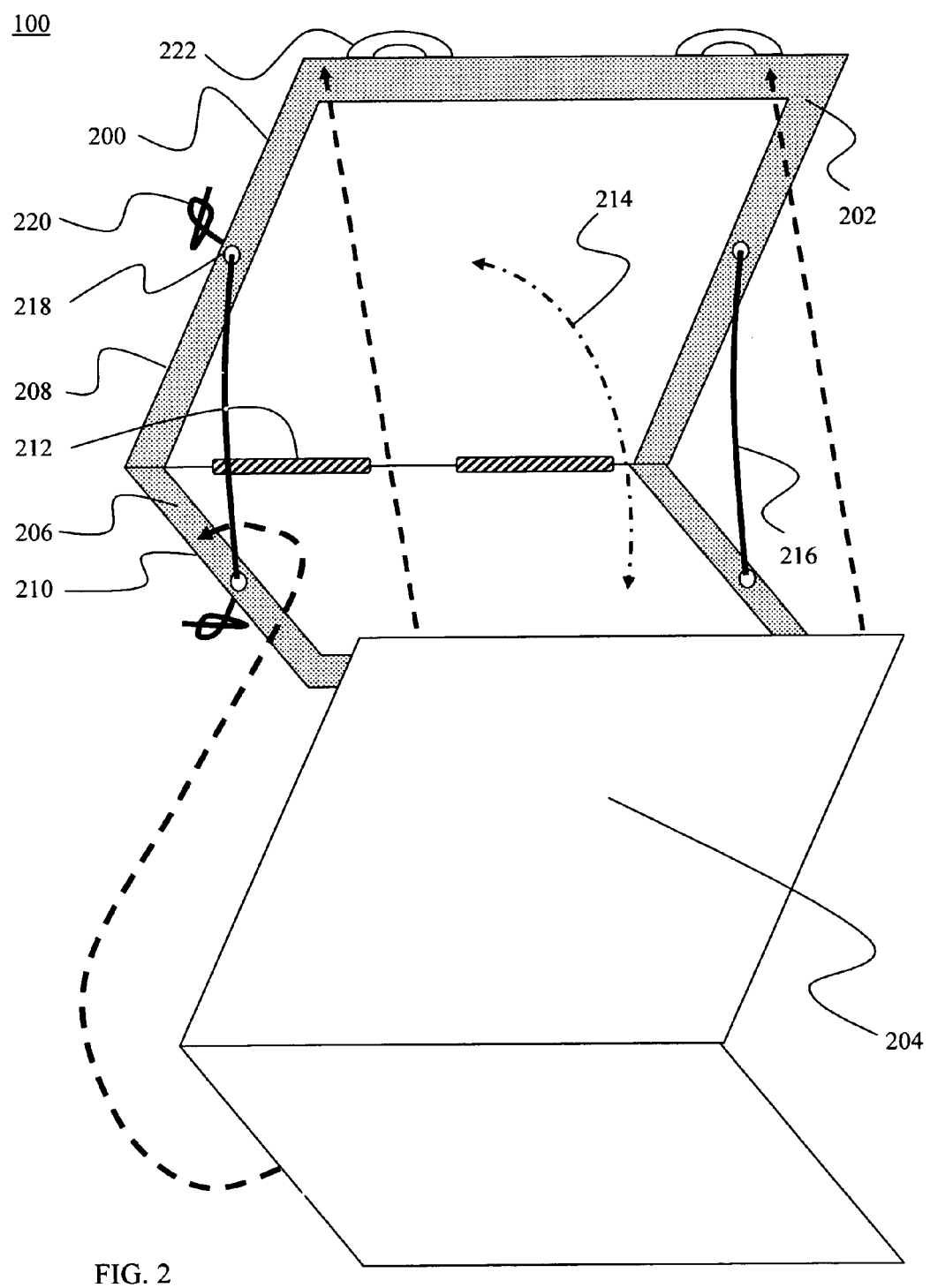
FIG. 2 is an illustration of a reflector apparatus according to the present invention.

As illustrated in FIG. 1, the present invention comprises a reflector apparatus 100 for reflecting light 102 from a lamp 104 upon a film set 106. As shown in FIG. 2, the reflector apparatus 100 includes a frame 200 constructed of a suitable fire retardant material, a non-limiting example of which includes a twin wall board made with a block-copolymer polypropylene resin with flame inhibiting additives and properties. With the flame inhibiting additives, the frame 200 has a flash point being above approximately 329° C., with a melting point being above approximately 160° C. The frame 200 is constructed of a material that is recognized by Underwriter's Laboratory as receiving a flame test rating of UL94v-2, Underwriter's Laboratory being located at 333 Pfingsten Road, Northbrook, Ill. 60062-2096 U.S.A. As a more specific example, the frame 200 may be constructed of Coroplast, which is produced by Coroplast, Inc., located at 4501 Spring Valley Road, Dallas, Tex. 75244, U.S.A. As another non-limiting example, the frame 200 may be constructed of Intepro, which is a mono- or co-extruded fluted polypropylene and polyethylene board that is produced by Inteplast Group, LTD., located at 9 Peach Tree Hill Road, Livingston, N.J., 07039, U.S.A.

An attachment apparatus 202 is connected with the frame 200. The attachment apparatus 202 is any mechanism or device for connecting one object with another, non-limiting examples of which include Velcro, snaps, and tape. The attachment apparatus 202 is used to attach a flexible fire retardant sheet 204 with the frame 200 and may be positioned at any suitable location on the frame 200, such as at a perimeter portion 206. The fire retardant sheet 204 is constructed of a flexible and reflective (e.g. bounce fabric) fire retardant material, non-limiting examples of which include ripstop, ultra bounce, and nugget cloth. The fire retardant sheet 204 contains fire retardant properties meeting the National Fire Protection Associations (N.F.P.A.) 701 Small Scale requirements, the N.F.P.A. being located at 1 Batterymarch Park, Quincy, Mass., 02169-7471, U.S.A. As another, yet non-limiting example, the fire retardant sheet 204 may be a nylon sheet with a urethane coating. Because it is detachably attached, the fire retardant sheet 204 can be removed from the frame 200 to be washed or replaced. Additionally, the fire retardant sheet 204 can be created in a plurality of colors, allowing a user to selectively use fire retardant sheets 204 of different colors.

The frame 200 includes a first part 208 and a second part 210, with a hinge 212 connecting the two parts. An angle 214 between the first part 208 and the second part 210 can be changed by pivoting the first 208 and second 210 parts about the hinge 212. After adjusted, the angle 214 is fixed through use of an adjuster 216. The adjuster 216 is connected with both the first 208 and second 210 parts such that the angle 214 can be fixed after being adjusted to a particular position, thereby allowing a user to fixedly adjust lighting conditions. The adjuster 216 is a mechanism or device allowing the angle 214 to be controllably positioned, non-limiting examples of which include a wire, rope, flex arm, and nylon strap with a buckle. For example, when a wire or rope is used, the wire or rope can be fed through holes 218 on the frame 200 and knotted up 220 to maintain the angle 214. Furthermore, the adjuster 216 can be connected with any portion of the frame 200, such as being connected with the perimeter portions 202 of the first 208 and second 210 parts.

In another aspect, at least one hanging hook 222 is attached with the perimeter portion 206 of the frame 200, thereby allowing a user to hang the reflector apparatus 100 with the at least one hanging hook 222.

Figure 3A:
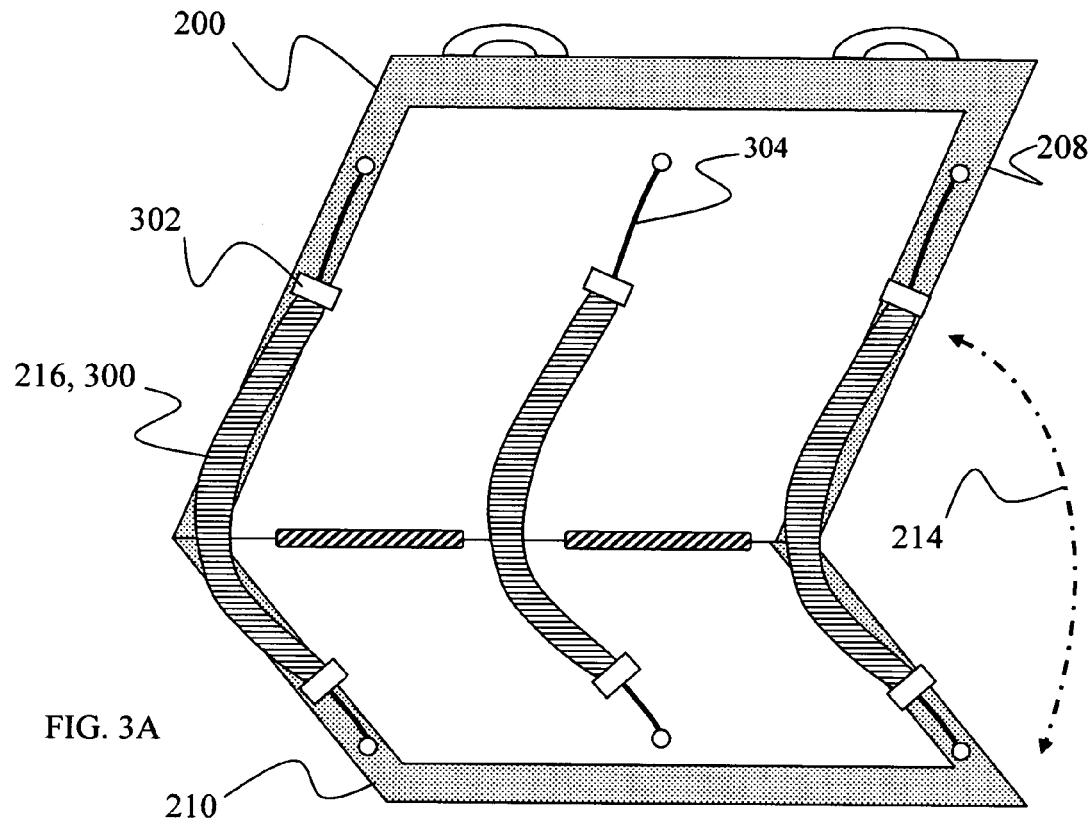
FIG. 3A is an illustration of reflector apparatus according to the present invention, with a flex arm incorporated therein.

As shown in FIG. 3A, when the adjuster 216 is a flex arm 300, the flex arm 300 is a rigid arm that can be forcibly bent into a particular shape, and when bent into the particular shape, maintains its shape until forcibly bent into another shape. Such bending allows a user to adjustably control the angle 214 between the first 208 and second 210 parts. The flex arm 300 can be connected with an exterior surface of the frame 200, or alternatively, sewn between layers of the frame 200. Caps 302 on the ends of the flex arm 300 allow a wire 304 to be connected with the flex arm 300. The wire 304 is attached with the frame 200 to help maintain tension on the frame 200.

Figure 3B:
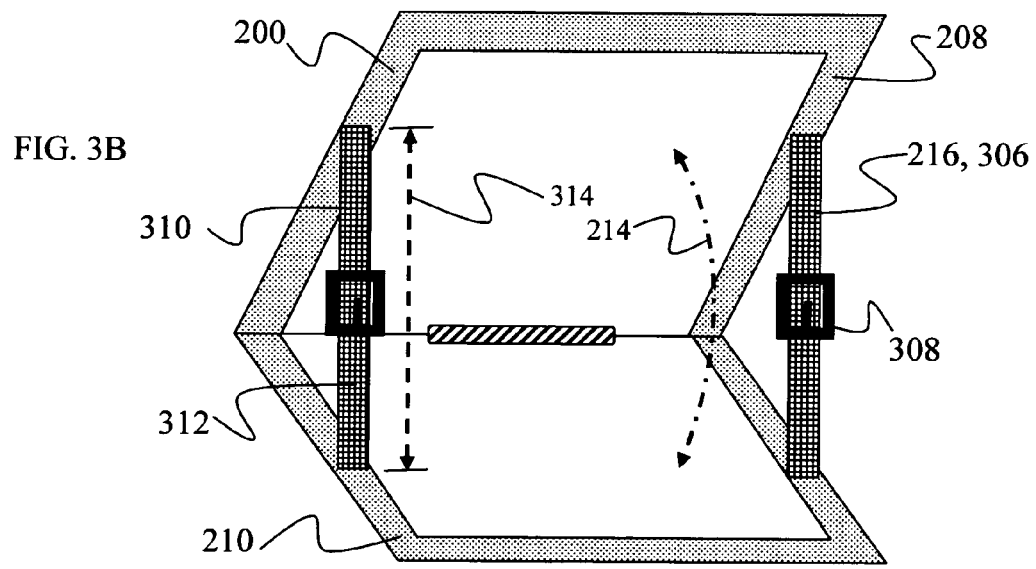
FIG. 3B is an illustration of reflector apparatus according to the present invention, with a nylon strap and buckle incorporated therein.

Another aspect of the adjuster 216 is shown in FIG. 3B, where the adjuster 216 is a nylon strap 306 with a buckle 308. The nylon strap 306 is connected with the frame 200 through a mechanism or device for connecting one object with another, non-limiting examples of which include being riveted, tied, melted, and sewn into the frame 200. The nylon strap 306 includes at least two portions, a first portion 310 and a second portion 312, with the at least two portions being connected with each other through the buckle 308. Through use of the buckle 308, a length 314 of the nylon strap 306 can be adjusted by tightening one of the at least two portions against the buckle 308. Adjusting the length 314 of the nylon strap 306 thereby adjusts the angle 214 between the first 208 and second parts 214 of the frame 200.

Figure 4:
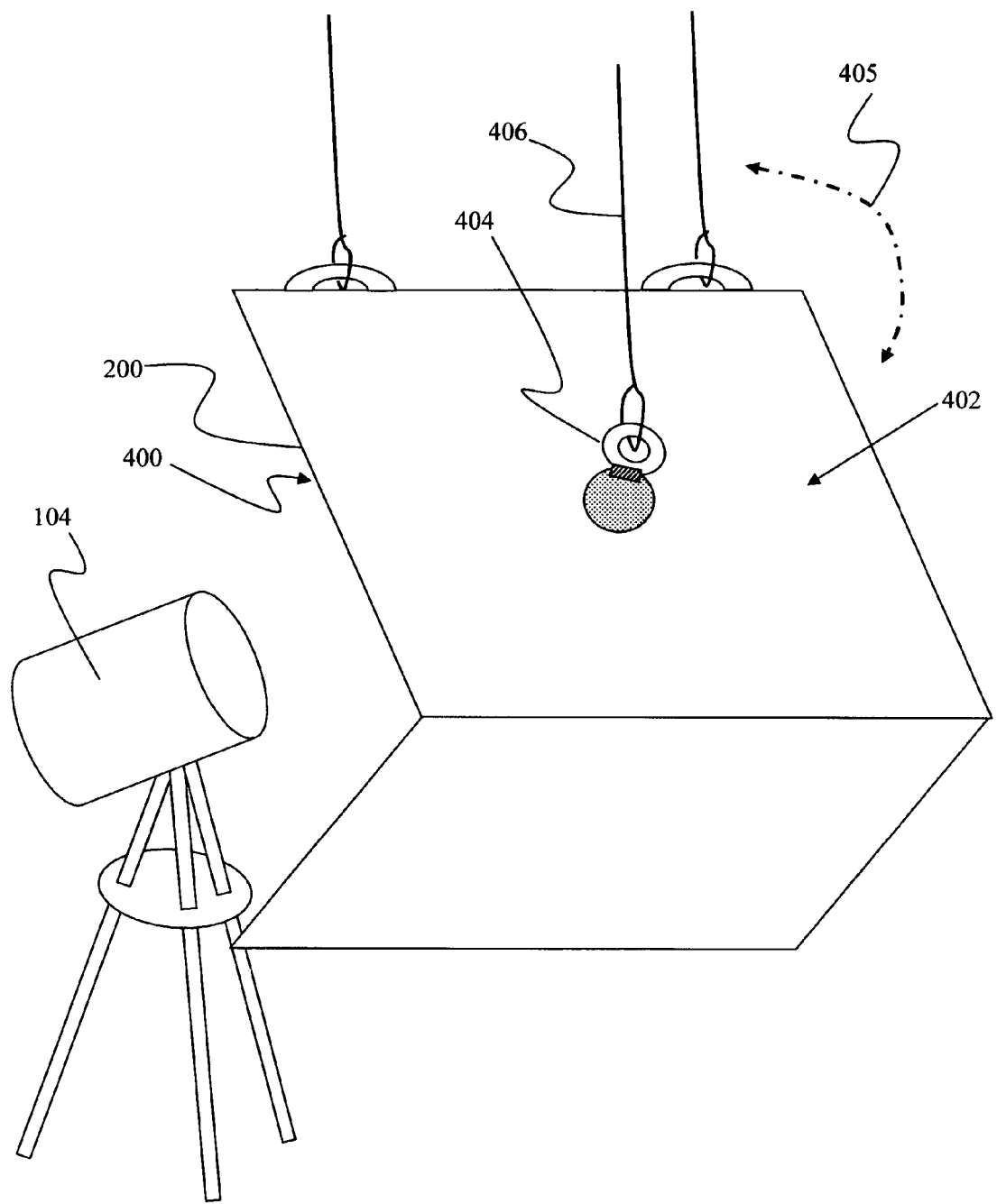
FIG. 4 is an illustration of a backside of a reflector apparatus according to the present invention.

As shown in FIG. 4, the frame 200 has a front side 400 and a back side 402. A hanging adjuster 404 is connected with the back side 402, thereby allowing a user to adjust an angle 405 of the frame 200 in relation to the lamp 104 by selectively attaching hanging objects 406 (e.g., rope, wire, tape) with the hanging adjuster 404. The hanging adjuster 404 is any mechanism or device that can be attached to hanging objects 406, a non-limiting example of which includes a spring loaded ring. The spring loaded ring may also be a flush mounted spring loaded ring, where when the ring is not pulled out, it is flush with the frame surface as the ring is tucked into the mount.

Figure 5:
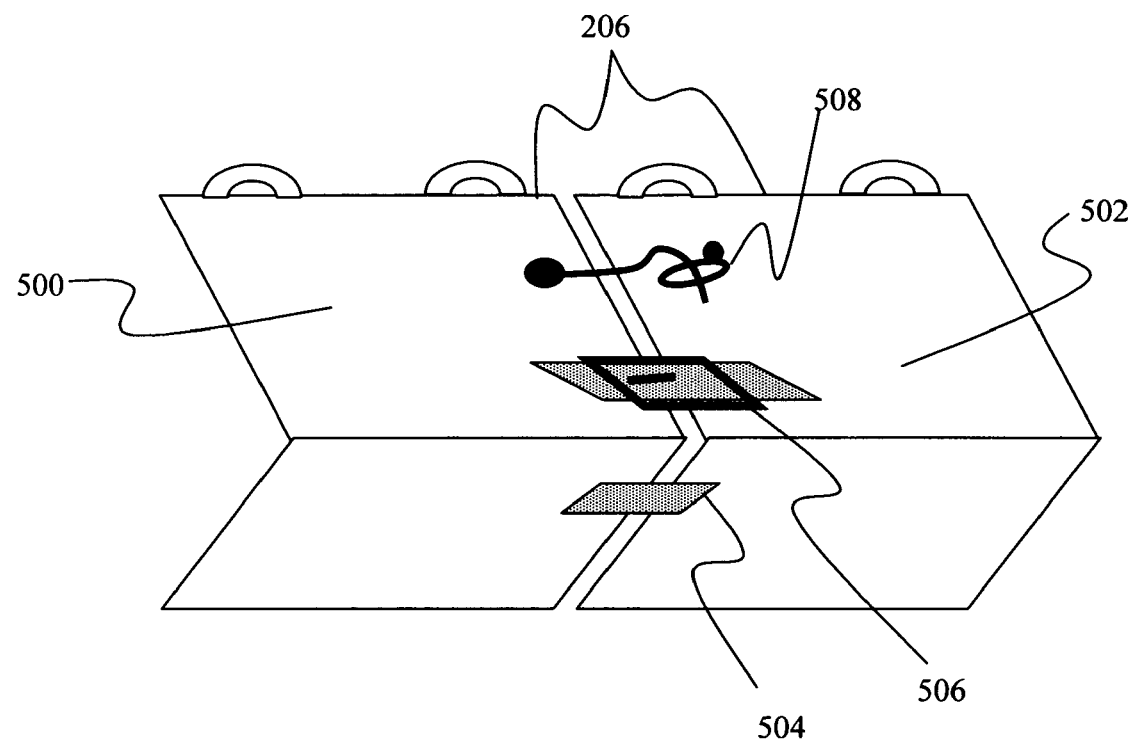
FIG. 5 is an illustration of a backside of a reflector apparatus attached with a backside of another reflector apparatus.

As shown in FIG. 5, at least one additional frame 500 can be connected with the perimeter portion 206 of another frame 502. The additional frame 500 is connected with the other frame 502 through any connecting mechanism or device, a non-limiting example of which includes Velcro 504, a buckle 506, and a hook and loop 508.

Figure 6:
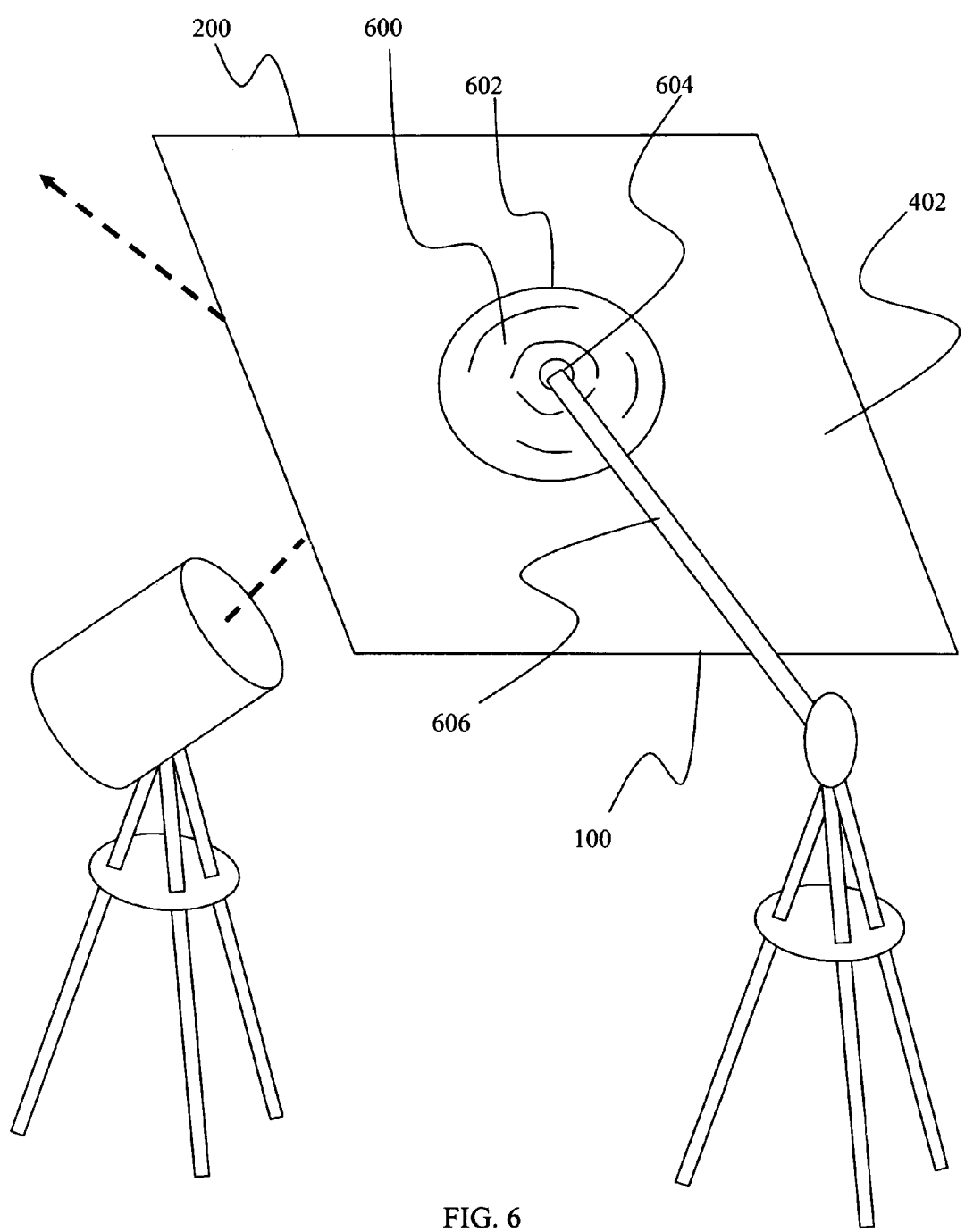
FIG. 6 is an illustration of another aspect of a reflector apparatus according to the present invention.

FIG. 6 illustrates another aspect of the reflector apparatus 100. In this aspect, the reflector apparatus 100 further comprises an angle controller 600 connected with the back side 402 of the frame 200, thereby allowing an angle of the frame 200 to be adjusted. The angle controller 600 is a mechanism or device for fixedly controlling an angle of an affixed object, a non-limiting example of which includes a plate 602 with a ball joint 604 and adjustable rod 606.

Figure 7:
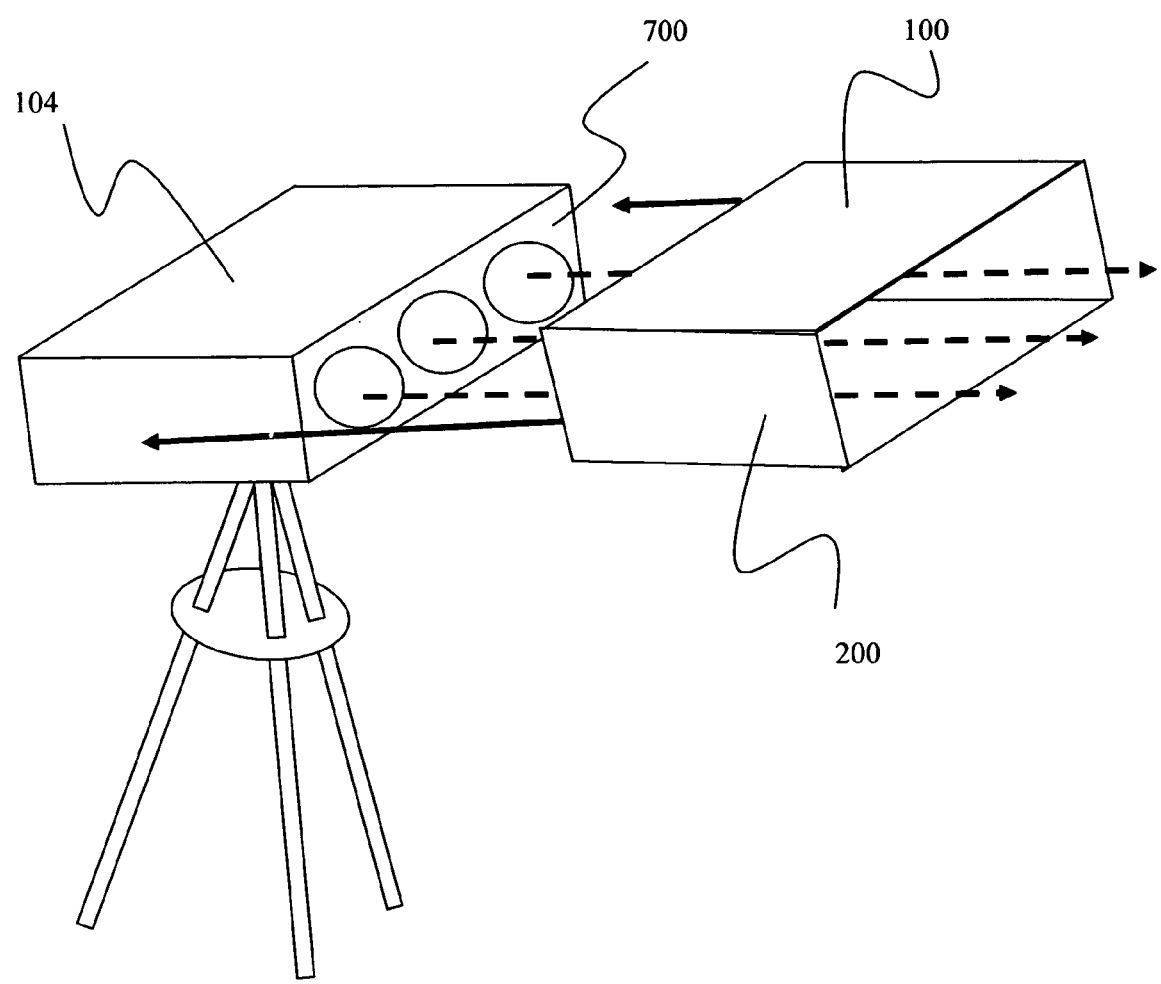
FIG. 7 is an illustration of yet another aspect of a reflector apparatus according to the present invention.

FIG. 7 illustrates yet another aspect of the reflector apparatus 100. In this particular aspect, the frame 200 is formed in a shape to slide over a light emitting end 700 of a lamp 104. As can be appreciated by one in the art, light emitting ends 700 of lamps 104 come in various shapes and sizes, such as being circular, or rectangular. Accordingly, the frame 200 can be formed to fit any shape and size of a light emitting end 700.

Figure 8:
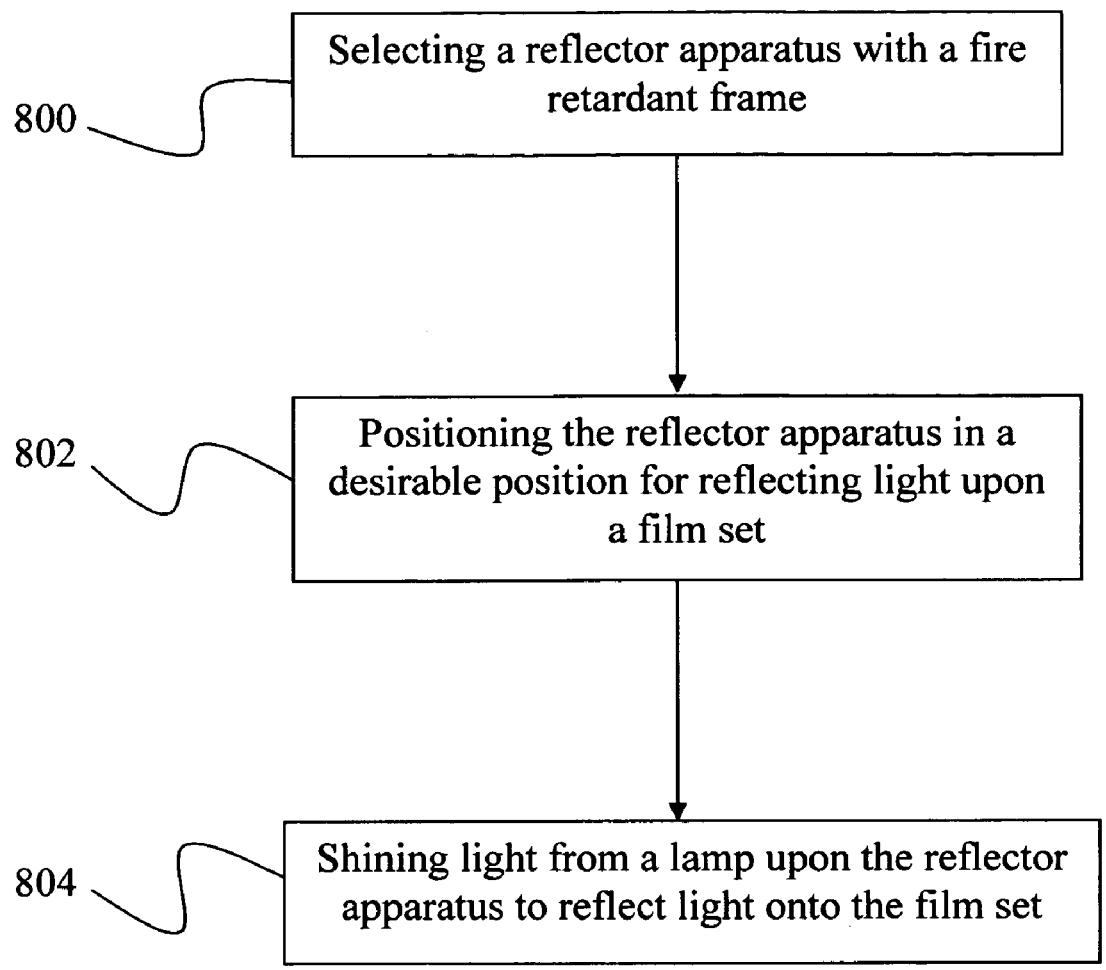
FIG. 8 is a flow chart illustrating a method for reflecting light according to the present invention.

As can be appreciated by one in the art, the present invention also comprises a method for reflecting light upon a film set using the reflector apparatus according to the present invention. As shown in FIG. 8, the method includes acts of selecting a reflector apparatus with a fire retardant frame 800; positioning the reflector apparatus in a desirable position for reflecting light upon a film set 802; and shining light from a lamp upon the reflector apparatus to reflect the light onto the film set 804. Furthermore, the act of selecting a reflector apparatus with a fire retardant frame 800 includes acts of selecting a reflector apparatus as described herein.

What is claimed is:

1. A reflector apparatus for reflecting light upon a film set, the reflector apparatus comprising:
   a fire retardant frame;
   wherein the fire retardant frame is formed of a twin wall board made with a block-copolymer polypropylene resin with flame inhibiting properties;
   further comprising an attachment apparatus connected with the frame, whereby a flexible fire retardant sheet can be attached with the frame through use of the attachment apparatus;
   wherein the attachment apparatus is selected from a group consisting of a touch fastener, snaps, and tape;
   wherein the frame includes a first part and a second part, and wherein the frame further includes a perimeter portion surrounding the frame, forming a perimeter portion on the first and second parts, and the attachment apparatus is connected with the frame at the perimeter portion;
   further comprising a flexible fire retardant sheet detachably attached with the attachment apparatus;
   wherein the fire retardant sheet is constructed of a material selected from a group consisting of ripstop, ultra bounce, and nugget cloth;
   wherein the reflector apparatus further comprises a hinge connecting the first part with the second part such that an angle between the first part and the second part can be changed by pivoting the first and second parts about the hinge, thereby allowing a user to change and control lighting conditions;
   further comprising an adjuster connected with both the first part and the second part, the adjuster allowing the angle between the first part and the second part to be fixedly adjusted to allow a user to fixedly adjust lighting conditions;
   wherein the adjuster is connected with the perimeter portions of the first and second parts;
   wherein the adjuster is selected from a group consisting of a wire, rope, nylon strap with a buckle, and a flex arm, the flex arm being a rigid arm that can be forcibly bent into a particular shape, and when bent into the particular shape, maintains its shape until forcibly bent into another shape;
   further comprising at least one hanging hook attached with the perimeter portion of the frame, thereby allowing user to hang the reflector apparatus with the at least one hanging hook; and
   wherein the frame has a front side and a back side, and wherein the reflector apparatus further comprises a hanging adjuster connected with the back side, thereby allowing a user to adjust an angle of the frame in relation to the lamp by selectively attaching hanging objects with the hanging adjuster, whereby through use of the reflector apparatus, a user can direct the light from a lamp onto the frame to be reflected onto the film set, allowing the user to control lighting conditions of the film set.

2. A reflector apparatus as set forth in claim 1, wherein the hanging adjuster is a spring loaded ring.

3. A reflector apparatus as set forth in claim 2, further comprising at least one additional frame connected with the perimeter portion of the frame, the additional frame being connected with the frame through a mechanism selected from a group consisting of a touch fastener, a buckle, and a hook and loop.

4. A method for reflecting light upon a film set, comprising acts of:
   positioning a reflector apparatus with a fire retardant frame in a desirable position for reflecting light upon a film set;
   shining light from a lamp upon the reflector apparatus to reflect the light onto the film set;
   further comprising an act of selecting a reflector apparatus with a fire retardant frame prior to the act of positioning the reflector apparatus;
   wherein in the act of selecting a reflector apparatus with a fire retardant frame, an act is performed of selecting a reflector apparatus with a frame formed of a twin wall board made with a block-copolymer polypropylene resin with flame inhibiting additives;
   wherein in the act of selecting a reflector apparatus with a fire retardant frame, an act is performed of selecting a reflector apparatus with an attachment apparatus connected with the frame, whereby a flexible fire retardant sheet can be attached with the frame through use of the attachment apparatus;
   wherein in the act of selecting a reflector apparatus with a fire retardant frame, an act is performed of selecting a reflector apparatus with a perimeter portion and with the attachment apparatus connected with the frame at the perimeter portion;
   wherein in the act of selecting a reflector apparatus with a fire retardant frame, an act is performed of selecting a reflector apparatus with a flexible fire retardant sheet detachably attached with the attachment apparatus;

wherein in the act of selecting a reflector apparatus with a fire retardant frame, an act is performed of selecting a reflector apparatus with a flexible fire retardant sheet being constructed of a material selected from a group consisting of ripstop, ultra bounce, and nugget cloth;

wherein in the act of selecting a reflector apparatus with a fire retardant frame, an act is performed of selecting a reflector apparatus with a frame that includes a first part and a second part, and wherein the reflector apparatus further comprises a hinge connecting the first part with the second part such that an angle between the first part and the second part can be changed by pivoting the first and second parts about the hinge, thereby allowing a user to change and control lighting conditions;

wherein in the act of selecting a reflector apparatus with a fire retardant frame, an act is performed of selecting a reflector apparatus with an adjuster connected with both the first part and the second part, the adjuster allowing the angle between the first part and the second part to be fixedly adjusted to allow a user to fixedly adjust lighting conditions;

wherein in the act of selecting a reflector apparatus with a fire retardant frame, an act is performed of selecting a reflector apparatus with the adjuster connected with the perimeter portion;

wherein in the act of selecting a reflector apparatus with a fire retardant frame, an act is performed of selecting a reflector apparatus with an adjuster selected from a group consisting of a wire, a rope, a nylon strap with a buckle, and a flex arm, the flex arm being a rigid arm that can be forcibly bent into a particular shape, and when bent into the particular shape, maintains its shape until forcibly bent into another shape;

wherein in the act of selecting a reflector apparatus with a fire retardant frame, an act is performed of selecting a reflector apparatus with at least one hanging hook attached with the perimeter portion of the frame, thereby allowing a user to hang the reflector apparatus with the at least one hanging hook; and wherein in the act of selecting a reflector apparatus with a fire retardant frame, an act is performed of selecting a reflector apparatus wherein the frame has a front side and a back side, and wherein the reflector apparatus further comprises a hanging adjuster connected with the back side, thereby allowing a user to adjust an angle of the frame in relation to the lamp by selectively attaching hanging objects with the hanging adjuster.

5. A method for reflecting light as set forth in claim 4, wherein in the act of selecting a reflector apparatus with a fire retardant frame, an act is performed of selecting a reflector apparatus wherein the hanging adjuster is a spring loaded ring.

6. A method for reflecting light as set forth in claim 5, wherein in the act of selecting a reflector apparatus with a fire retardant frame, an act is performed of selecting a reflector apparatus with at least one additional frame connected with the perimeter portion of the frame, the additional frame being connected with the frame through a mechanism selected from a group consisting of a touch fastener, a buckle, and a hook and loop.

* * * * *